Patented June 8, 1937

2,083,063

UNITED STATES PATENT OFFICE 2,083,063

RESINOUS COMPOSITIONS

Norman D. Hanson, Bloomfield, N. J., assignor to Bakelite Corporation, New York, N. Y., a corporation of Delaware No Drawing. Application April 6, 1935, Serial No. 15,136

7 Claims. (Cl. 106—22)

This invention relates to new resinous compositions and particularly to plastic, fire-resistant compositions containing resins of the phenol-aldehyde type and to new resin-fiber compositions containing the same.

A principal purpose of the invention is the production of a plastic, fire-resistant resinous composition.

A further object of the invention is the production of fire-resistant, resin-fiber compositions capable of being punched cold without crazing or cracking.

Another object is the production of a cold punching resin-fiber composition of high arc resistance.

These and other purposes and advantages are effected by plasticizing a phenol-aldehyde resin, particularly a heat-hardenable resin, with a triaryl phosphate, such as tricresyl-phosphate, and a chlorinated naphthalene.

It has been found that by the concurrent use of triaryl-phosphates and chlorinated naphthalene in phenolic resins, a high degree of flame resistance can be obtained, and that resin-fiber compositions made therefrom, for example, laminated products, are distinguished not only by an exceptional degree of flame resistance but by a high arc resistance and by the ability to withstand cold punching without crazing or cracking.

While the use of chlorinated naphthalene for increasing the flame resistance of compositions has been previously proposed, phenolic resin compositions containing substantial amounts of chlorinated naphthalene are not satisfactory for many purposes as the chlorinated naphthalene very readily separates from the resin. For example, when a varnish comprising a solution of a phenolic resin and including substantial amounts of chlorinated naphthalene is allowed to dry in a film, a deposit of clorinated naphthalene separates out which for many purposes is very undesirable. It has now been found that by simultaneously adding triaryl phosphates to the resin composition, not only may substantial amounts of chlorinated naphthalene be added to the composition without separating out, but the resulting composition has an increased flame resistance, and when made into resin-fiber compositions, such as laminated materials, articles are produced of outstanding cold-punching properties and high arc resistance.

Preferably, the chlorinated naphthalene used is one that is solid at normal room temperatures. Such substances are commercially available under the trade-mark "Halowax." A product comprising a mixture of tri- and tetra-chloro-naphthalenes has been found suitable for use in the invention.

A wide variation in the amounts of chlorinated naphthalene and triaryl phosphate is possible, but in general an amount of triaryl phosphate sufficient to prevent separation of the chlorinated naphthalene should be used. The chlorinated naphthalene may be added to the phenol-aldehyde condensation product after it is made or during the condensation process.

A satisfactory method of utilizing the phenolic resin- triaryl phosphate- chlorinated naphthalene products of the invention is to form varnishes by dissolving the products in volatile solvents. Fibrous materials either in loose or sheet form may be impregnated with these varnishes and molded into any desired shape and converted into a permanently hardened condition by heating under pressure.

For example, a resin varnish is produced by reacting 100 parts of cresylic acid, 78.3 parts of 37% aqueous formaldehyde solution and 3.5 parts of 26° Beaumé aqueous ammonia and adding 70.5 parts of denatured alcohol. To 1400 parts of this varnish are added 250 parts of chlorinated naphthalene, 200 parts of tricresyl phosphate and 250 parts of toluol.

This varnish may be used, for example, to impregnate sheets of fibrous material such as asbestos, kraft paper, or textile fabrics. When such impregnated sheets are superposed and the superposed sheets hardened under heat and pressure, there is produced a laminated structure having high flame and arc resistance and capable of being cold punched without crazing or cracking.

I claim:

1. A resinous composition comprising a heat-hardenable phenol-aldehyde condensation product, a chlorinated naphthalene and a triaryl phosphate in amount sufficient to prevent separation of the chlorinated naphthalene.

2. A resinous composition comprising a phenol-aldehyde condensation product, a chlorinated naphthalene and tricresyl phosphate in amount sufficient to prevent separation of the chlorinated naphthalene.

3. A resinous composition comprising a phenol-aldehyde condensation product, a chlorinated naphthalene and a triaryl phosphate in amount sufficient to prevent separation of the chlorinated naphthalene.

4. A resin-fiber composition comprising a fibrous material, a heat-hardenable phenol-aldehyde condensation product, a chlorinated naphthalene and a triaryl phosphate in amount sufficient to prevent separation of the chlorinated naphthalene.

5. A resin-fiber composition comprising a fibrous material, a heat-hardenable phenol-aldehyde condensation product, a chlorinated naphthalene and tricresyl phosphate in amount sufficient to prevent separation of the chlorinated naphthalene.

6. A resin-fiber article comprising a fibrous material, a heat-hardened phenol-aldehyde condensation product, a chlorinated naphthalene and a triaryl phosphate in amount sufficient to prevent separation of the chlorinated naphthalene.

7. A resin-fiber article comprising a fibrous material, a heat-hardened phenol-aldehyde condensation product, a chlorinated naphthalene and tricresyl phosphate in amount sufficient to prevent separation of the chlorinated naphthalene.

NORMAN D. HANSON.